US012348353B2

(12) United States Patent
Jamin et al.

(10) Patent No.: US 12,348,353 B2
(45) Date of Patent: Jul. 1, 2025

(54) RF COMMUNICATION DEVICE AND OPERATING METHOD

(71) Applicant: NXP B.V., Eindhoven (NL)

(72) Inventors: Olivier Jérôme Célestin Jamin, Sainte Honorine du Fay (FR); Ludovic Oddoart, Opio (FR); Gilles Seferian, Mondeville (FR)

(73) Assignee: NXP B.V., Eindhove (NL)

( * ) Notice: Subject to any disclaimer, the term of this patent is extended or adjusted under 35 U.S.C. 154(b) by 7 days.

(21) Appl. No.: 18/469,164

(22) Filed: Sep. 18, 2023

(65) Prior Publication Data

US 2024/0121148 A1 Apr. 11, 2024

(30) Foreign Application Priority Data

Oct. 6, 2022 (EP) .................................... 22306501

(51) Int. Cl.
*H04L 27/36* (2006.01)
*H04B 1/04* (2006.01)
(52) U.S. Cl.
CPC ......... *H04L 27/364* (2013.01); *H04B 1/0475* (2013.01)
(58) Field of Classification Search
CPC ....... H04L 27/364; H04B 1/0475; H04B 5/48; H04B 5/70; H04W 4/80
USPC .......................... 375/320, 322, 326, 331, 339
See application file for complete search history.

(56) References Cited

U.S. PATENT DOCUMENTS

| | | | | | |
|---|---|---|---|---|---|
| 3,253,223 | A | * | 5/1966 | Kettel | H04L 27/2331 327/248 |
| 5,497,400 | A | * | 3/1996 | Carson | H04L 27/2272 327/39 |
| 5,537,121 | A | * | 7/1996 | Lennen | G01S 19/32 342/357.75 |
| 5,677,934 | A | * | 10/1997 | Ostman | H04B 7/005 375/232 |
| 6,134,282 | A | * | 10/2000 | Ben-Efraim | H04B 1/1027 375/350 |
| 8,064,863 | B1 | * | 11/2011 | Reed | H04B 1/30 455/67.11 |
| 8,571,139 | B2 | * | 10/2013 | Polaert | H04L 7/0054 375/322 |
| 9,634,878 | B1 | * | 4/2017 | Bench | F17D 5/00 |
| 9,806,771 | B1 | | 10/2017 | Hueber et al. | |
| 10,735,115 | B2 | | 8/2020 | Hueber et al. | |
| 2005/0270095 | A1 | | 12/2005 | Burke et al. | |

(Continued)

OTHER PUBLICATIONS

Volder, Jack E.; "The CORDIC Trigonometric Computing Technique" in IRE Transactions on Electronic Computers, vol. EC-8, Issue 3, pp. 330-334; Sep. 1959; doi: 10.1109/TEC.1959.5222693.

*Primary Examiner* — Emmanuel Bayard

(57) ABSTRACT

In accordance with a first aspect of the present disclosure, a radio frequency (RF) communication device is provided, comprising: a receiver unit configured to receive at least one radio frequency signal, wherein the receiver unit has a variable initial phase; a controller configured to change said initial phase; a measurement unit configured to measure a plurality of amplitudes and/or phases of the radio frequency signal, wherein each of said amplitudes and/or phases of the radio frequency signal corresponds to a different initial phase of the receiver unit. In accordance with a second aspect of the present disclosure, a corresponding method of operating an RF communication device is conceived.

16 Claims, 12 Drawing Sheets

(56) References Cited

U.S. PATENT DOCUMENTS

| | | | |
|---|---|---|---|
| 2006/0068739 A1* | 3/2006 | Maeda | H04B 1/30 |
| | | | 455/283 |
| 2006/0074558 A1* | 4/2006 | Williamson | G01S 19/15 |
| | | | 342/357.56 |
| 2006/0211390 A1* | 9/2006 | Uozumi | H04B 1/0082 |
| | | | 455/180.3 |
| 2008/0130800 A1* | 6/2008 | Maxim | H03C 3/40 |
| | | | 375/345 |
| 2013/0094556 A1* | 4/2013 | Itkin | H04B 1/3833 |
| | | | 375/224 |
| 2013/0244578 A1* | 9/2013 | Bacioccola | H04M 1/72415 |
| | | | 455/41.2 |
| 2015/0229417 A1 | 8/2015 | Reed et al. | |
| 2018/0275281 A1* | 9/2018 | Liu | G01S 19/34 |

* cited by examiner

200

202
Receiving, by a receiver unit comprised in an RF communication device, at least one radio frequency signal, wherein the receiver unit has a variable initial phase

204
Changing, by a controller comprised in the RF communication device, said initial phase

206
Measuring, by a measurement unit comprised in the RF communication device, a plurality of amplitudes and/or phases of the radio frequency signal, wherein each of said amplitudes and/or phases of the radio frequency signal corresponds to a different initial phase of the receiver unit

FIG. 2

RF COMMUNICATION DEVICE AND OPERATING METHOD

CROSS-REFERENCE TO RELATED APPLICATIONS

This application claims priority under 35 U.S.C. § 119 to European Patent Application No. 22306501.2, filed on Oct. 6, 2022, the contents of which are incorporated by reference herein.

TECHNICAL FIELD

The present disclosure relates to a radio frequency (RF) communication device. Furthermore, the present disclosure relates to a corresponding method of operating an RF communication device.

BACKGROUND

RF communication devices, such as radio frequency identification (RFID) devices and near field communication (NFC) devices, may be used in a wide range of applications. Nowadays, radio frequency identification (RFID) transponders are widely used, in different areas of industry and commerce and for various purposes. RFID transponders may for example be embodied as so-called RFID tags or RFID cards. It is noted that, in the present disclosure, near field communication (NFC) transponders are regarded as a specific type of RFID transponders. Thus, the principles disclosed herein may also be applied to NFC transponders. NFC refers to a set of communication protocols that enable two electronic devices to establish communication by bringing them within proximity of each other. The communication range of NFC is typically in the order of centimeters (e.g., 10 centimeters or less). NFC technology can be used to carry out various transactions, such as transactions for accessing buildings, transactions for accessing public transportation sites or vehicles, and payment transactions.

SUMMARY

In accordance with a first aspect of the present disclosure, a radio frequency (RF) communication device is provided, comprising: a receiver unit configured to receive at least one radio frequency signal, wherein the receiver unit has a variable initial phase; a controller configured to change said initial phase; a measurement unit configured to measure a plurality of amplitudes and/or phases of the radio frequency signal, wherein each of said amplitudes and/or phases of the radio frequency signal corresponds to a different initial phase of the receiver unit.

In one or more embodiments, the controller is configured to rotate the initial phase of the receiver unit in order to obtain a plurality of different initial phases.

In one or more embodiments, the controller is configured to rotate the initial phase along an IQ-plane, such that the different initial phases are equidistant phase locations along the IQ-plane.

In one or more embodiments, the controller is configured to rotate the initial phase of the receiver unit across a full trigonometric circle or across a part of said trigonometric circle.

In one or more embodiments, the RF communication device further comprises a processing unit configured to calculate an average value of the plurality of measured amplitudes and/or phases of the radio frequency signal.

In one or more embodiments, the processing unit is configured to calculate the average of the measured phases after adding a receiver clock phase shift for each of the measured phases.

In one or more embodiments, the RF communication device further comprises a clock recovery unit configured to lock a mixer clock of the receiver unit to the phase of the radio frequency signal.

In one or more embodiments, the RF communication device further comprises a transmitter unit and a reference clock, wherein the reference clock is shared between the receiver unit and the transmitter unit, and wherein the controller is further configured to change an initial phase of the transmitter unit.

In one or more embodiments, the measurement unit is configured to measure a plurality of further amplitudes and/or phases of the radio frequency signal, wherein each of said further amplitudes and/or phases of the radio frequency signal corresponds to a different initial phase of the transmitter unit.

In one or more embodiments, the RF communication device further comprises a processing unit configured to calculate an average value of the plurality of measured further amplitudes and/or phases of the radio frequency signal.

In one or more embodiments, the RF communication device is a near field communication (NFC) device and/or a wireless charging device.

In one or more embodiments, the RF communication device is configured to perform a low-power card detection for NFC or NFC-based wireless charging.

In accordance with a second aspect of the present disclosure, a method of operating a radio frequency (RF) communication device is conceived, the RF communication device comprising a receiver unit, a controller and a measurement unit, and the method comprising: receiving, by the receiver unit, at least one radio frequency signal, wherein the receiver unit has a variable initial phase; changing, by the controller, said initial phase; measuring, by the measurement unit, a plurality of amplitudes and/or phases of the radio frequency signal, wherein each of said amplitudes and/or phases of the radio frequency signal corresponds to a different initial phase of the receiver unit.

DESCRIPTION OF DRAWINGS

Embodiments will be described in more detail with reference to the appended drawings.

FIG. 2 shows an illustrative embodiment of a method of operating an RF communication device.

DESCRIPTION OF EMBODIMENTS

Figure 1:
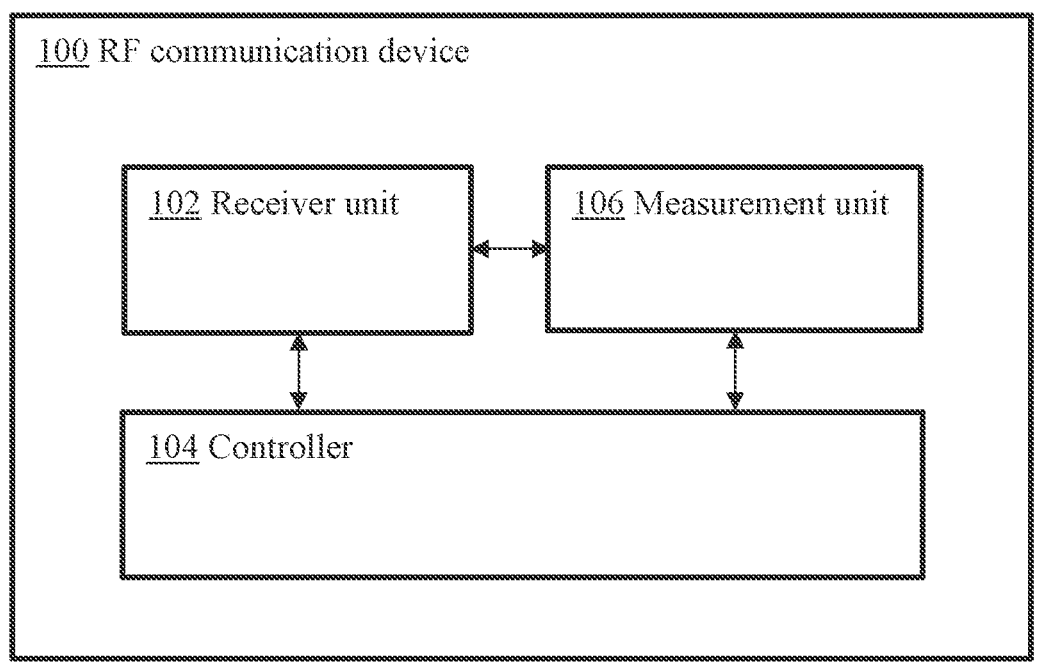
FIG. 1 shows an illustrative embodiment of an RF communication device.

As mentioned above, RF communication devices, such as radio frequency identification (RFID) devices and near field communication (NFC) devices, may be used in a wide range of applications. In many applications of RF communication devices, it is important to measure the amplitude and/or phase of received signals with sufficient accuracy. For instance, it may important that the so-called received signal strength indicator (RSSI) is accurately determined. Typical use cases of an RSSI function in radio transceivers are wake-up of an integrated circuit (IC) at an accurate threshold or an accurate confirmation of a wake-up, power control loops such as automatic power control in NFC devices, amplitude/gain calibrations during chip manufacturing, and customer manufacturing tests involving calibration of platform non-idealities (antenna, matching network, etc.). Specifically, in an NFC transceiver use case a typical target for the accuracy may be to keep the error margin as small as a few percent. Thus, it may be important to accurately measure the amplitude of a received signal.

Accurate phase measurements are useful in various systems and applications, such as clock recovery systems and phase calibrations during chip manufacturing, and customer manufacturing tests (matching network phase calibration), especially in RFID/NFC systems. Furthermore, simultaneous amplitude and phase measurements are also a useful feature in, at least, the use cases of low-power card detection (LPCD) in NFC-based transactions between devices and in NFC-based wireless charging devices. When LPCD is applied in NFC-based transactions, a reader periodically transmits bursts of a continuous field. If there is card in proximity, the characteristics of the feedback signal to the input terminal of the receiver unit within the reader changes, in particular the amplitude and/or phase of the feedback signal. The ability to measure this change of the characteristics is a key performance indicator. Similar to LPCD for use in NFC-based transactions, accurate phase measurements are useful for LPCD in NFC-based wireless charging devices. In these devices, the input signal may be highly distorted.

Amplitude and phase measurement units typically use the main receiver path of an RF communication device. Therefore, only a limited amount of additional hardware is needed to perform this function, or no additional hardware at all. The amplitude and phase measurement may involve calibration of the RF/analog front-end. Ultimately, the accuracy of the amplitude and phase measurement accuracy is limited by IQ mismatch, i.e., the mismatch between offsets, gains and phases in the I-channel and the Q-channel of the receiver unit. Given such remaining IQ imbalances and/or strong distortion, i.e., harmonic content, of the input signal, it may be difficult to realize an accurate amplitude/RSSI and phase measurement unit.

Now discussed are an RF communication device and a corresponding method of operating an RF communication device, which facilitate achieving an accurate measurement of the amplitude and/or phase of a received RF signal, i.e., of an input signal of the RF communication device. The RF communication device may be implemented as an RFID device, more specifically as an NFC device.

FIG. 1 shows an illustrative embodiment of an RF communication device 100. The RF communication device 100 comprises a receiver unit 102, a controller 104 and a measurement unit 106. The receiver unit 102 is configured to receive at least one radio frequency signal, wherein the receiver unit has a variable initial phase. Furthermore, the controller 104 is configured to change said initial phase. Furthermore, the measurement unit 106 is configured to measure a plurality of amplitudes and/or phases of the radio frequency signal, wherein each of said amplitudes and/or phases of the radio frequency signal corresponds to a different initial phase of the receiver unit. By measuring the amplitudes and/or phases of the radio frequency signal for different initial phases of the receiver unit, a more accurate estimation of the amplitude and/or phase of the received signal (i.e., the radio frequency signal) may be achieved. For instance, the measured amplitudes and/or phases may be combined to produce a more accurate amplitude and/or phase value. It is noted that the initial phase of the receiver may specifically refer to a clock offset applied to a mixer comprised in the receiver. In addition, the initial phase may refer to a clock offset applied to other components of the receiver, such as a baseband amplifier (BBA) or baseband processor and an analog-to-digital converter (ADC). More specifically, the initial phase of the receiver may correspond to the initial phase of the mixer clock, which can be shifted by a clock generator. For practical reasons, the clocks of the following blocks in the receiver (i.e., BBA and ADC) may be shifted as well. Thus, the initial phase refers to a signal processed by the receiver unit, in particular to the clock signal provided to the mixer and optionally to other components of the receiver unit. Furthermore, a variable initial phase means that the initial phase is adjustable, or in other words that the clock offset applied to the mixer and the other components can be adjusted.

In one or more embodiments, the controller is configured to rotate the initial phase of the receiver unit in order to obtain a plurality of different initial phases. Thereby, it may be achieved that a suitable set of initial phases is selected, which may be combined to increase the accuracy of the measurement of the amplitude and/or phase of a received RF signal. Furthermore, in one or more embodiments, the controller is configured to rotate the initial phase along an IQ-plane, such that the different initial phases are equidistant phase locations along the IQ-plane. Thereby, a particularly suitable set of initial phases is obtained, which may be combined to increase the measurement accuracy. In a practical implementation, the controller is configured to rotate the initial phase of the receiver unit across a full trigonometric circle or across a part of said trigonometric circle.

In one or more embodiments, the RF communication device further comprises a processing unit configured to calculate an average value of the plurality of measured amplitudes and/or phases of the radio frequency signal. In this way, the amplitudes and/or phases measured at different initial phases of the receiver unit may easily be combined to produce a more accurate amplitude and/or phase value. It is noted that the processing unit may be a stand-alone unit within the RF communication device or be integrated into the measurement unit, for example. In one or more embodiments, the processing unit is configured to calculate the average of the measured phases after adding a receiver clock phase shift for each of the measured phases. Thereby, an accurate phase value may be produced, based on the combination of the measured phases at different initial phases of the receiver unit.

In one or more embodiments, the RF communication device further comprises a clock recovery unit configured to lock a mixer clock of the receiver unit to the phase of the radio frequency signal. In this way, the receiver unit may be phase-and-frequency locked on the input signal. In one or more embodiments, the RF communication device further comprises a transmitter unit and a reference clock, wherein the reference clock is shared between the receiver unit and the transmitter unit, and wherein the controller is further configured to change an initial phase of the transmitter unit. Furthermore, the measurement unit may be configured to measure a plurality of further amplitudes and/or phases of the radio frequency signal, wherein each of said further amplitudes and/or phases of the radio frequency signal corresponds to a different initial phase of the transmitter unit. In addition, the RF communication device may further comprise a processing unit configured to calculate an average value of the plurality of measured further amplitudes and/or phases of the radio frequency signal. Thus, a variable phase shift may be applied to the transmitter unit of the RF communication device, for example to properly calibrate an off-chip element, such as a matching network.

As mentioned above, the RF communication device may be implemented as a near field communication (NFC) device and/or a wireless charging device. In that case, the RF communication device may be configured to perform a low-power card detection for NFC or NFC-based wireless charging. Both the low-power card detection and the wireless charging may require an accurate estimation of the amplitude and/or phase of the received signal.

FIG. 2 shows an illustrative embodiment of a method 200 of operating an RF communication device. The method 200 comprises the following steps. At 202, a receiver unit comprised in the RF communication device receives at least one radio frequency signal, wherein the receiver unit has a variable initial phase. Furthermore, at 204, a controller comprised in the RF communication device changes said initial phase. Furthermore, at 206, a measurement unit comprised in the RF communication device measures a plurality of amplitudes and/or phases of the radio frequency signal, wherein each of said amplitudes and/or phases of the radio frequency signal corresponds to a different initial phase of the receiver unit. As mentioned above, by measuring the amplitudes and/or phases of the radio frequency signal for different initial phases of the receiver unit, a more accurate estimation of the amplitude and/or phase of the received signal may be achieved.

Figure 3:
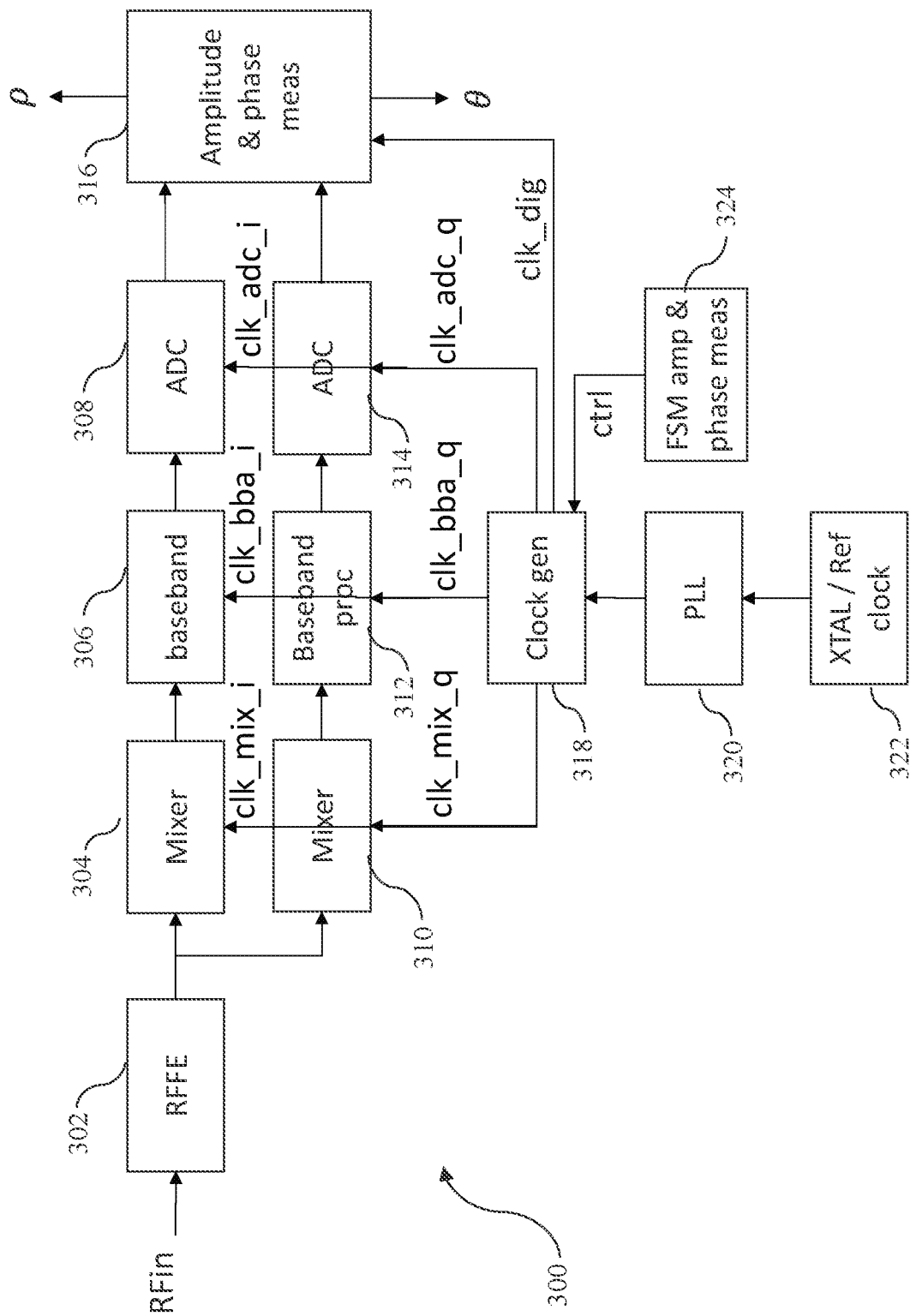
FIG. 3 shows another illustrative embodiment of an RF communication device.
Figure 4A:
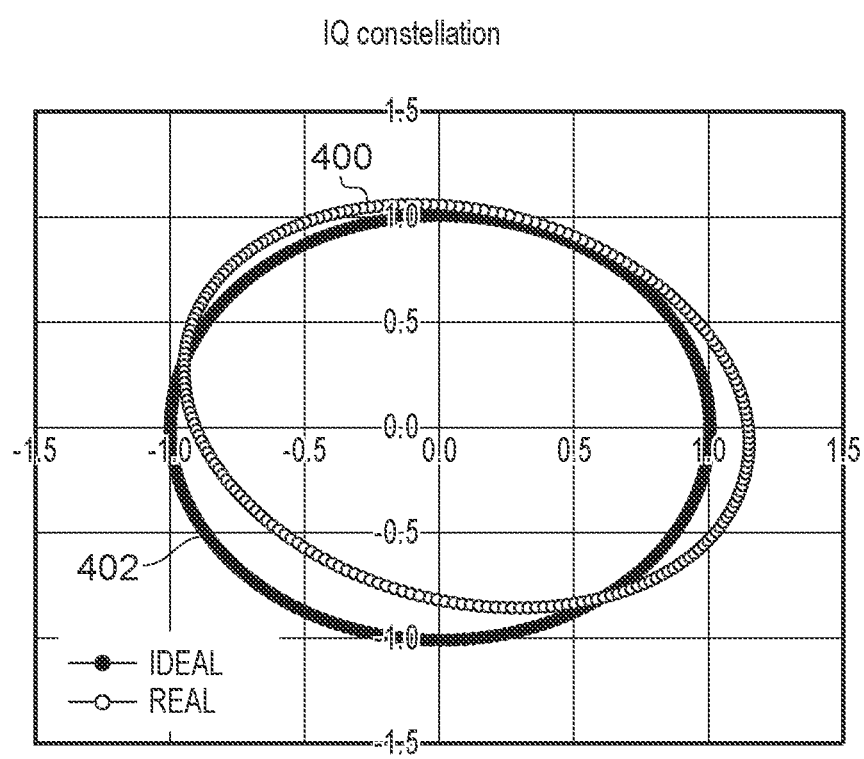
FIG. 4A shows a real IQ constellation and an ideal IQ constellation.
Figure 4B:
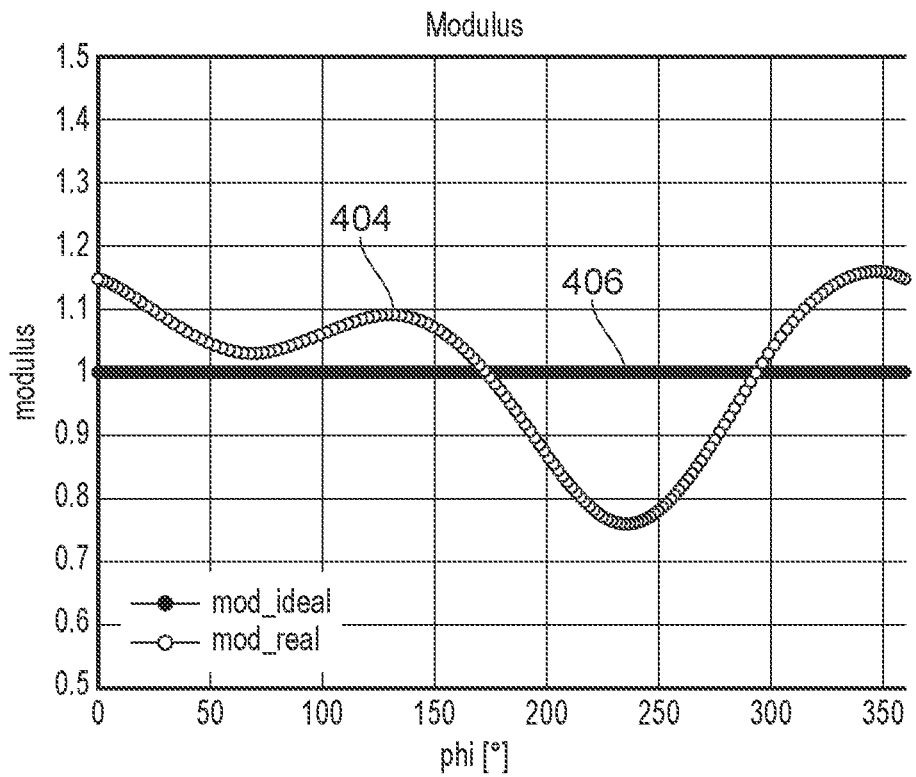
FIG. 4B shows a real modulus and an ideal modulus.
Figure 4C:
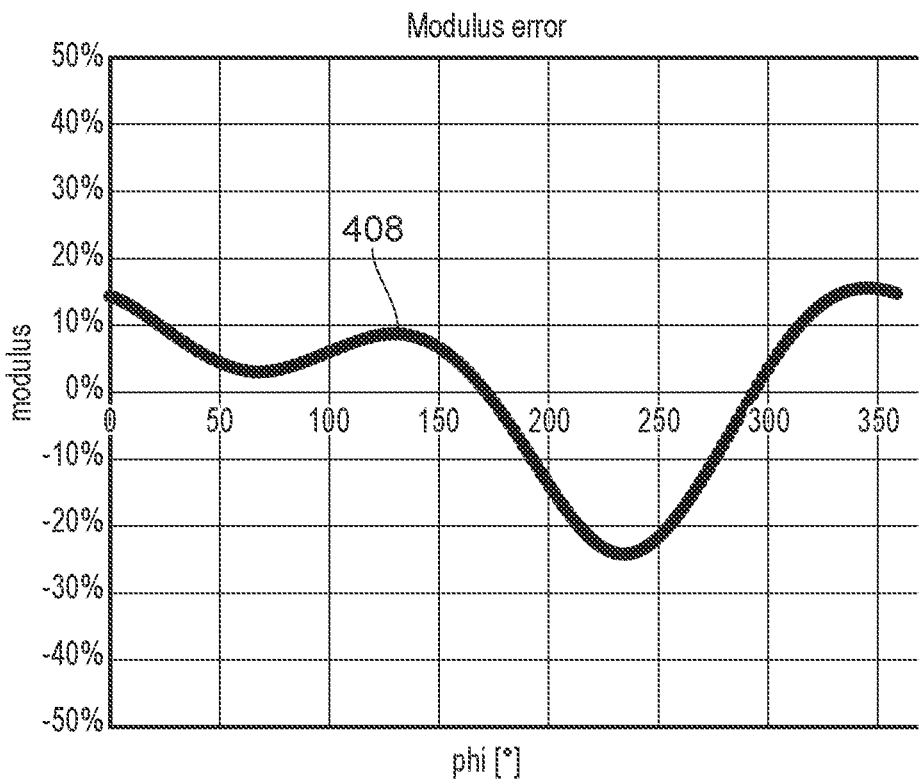
FIG. 4C shows a modulus error.
Figure 4D:
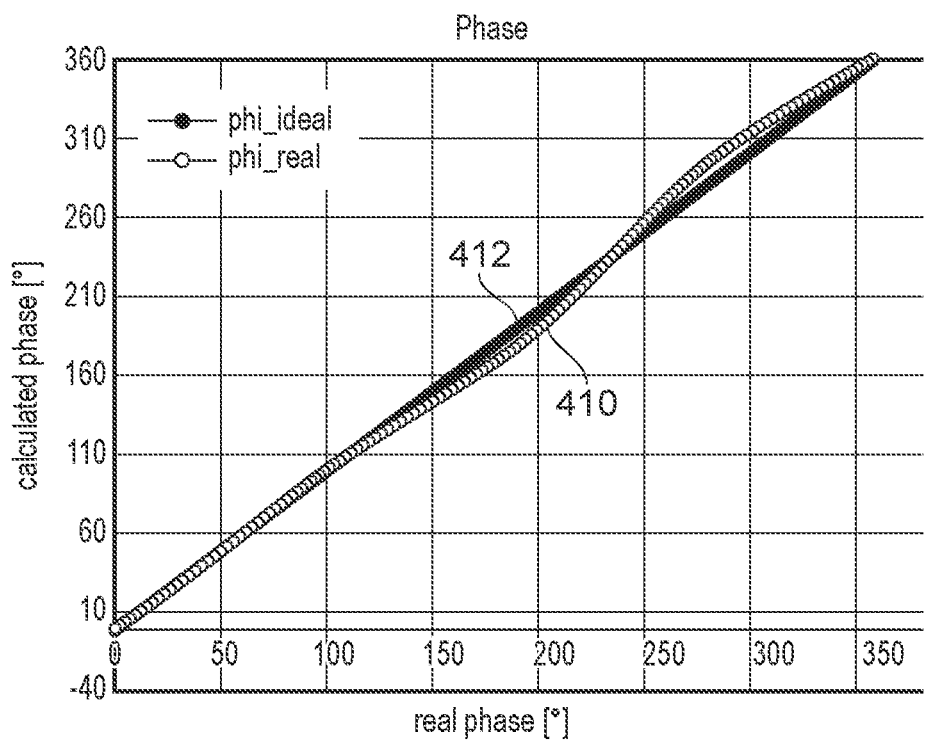
FIG. 4D shows a real phase and an ideal phase.
Figure 4E:
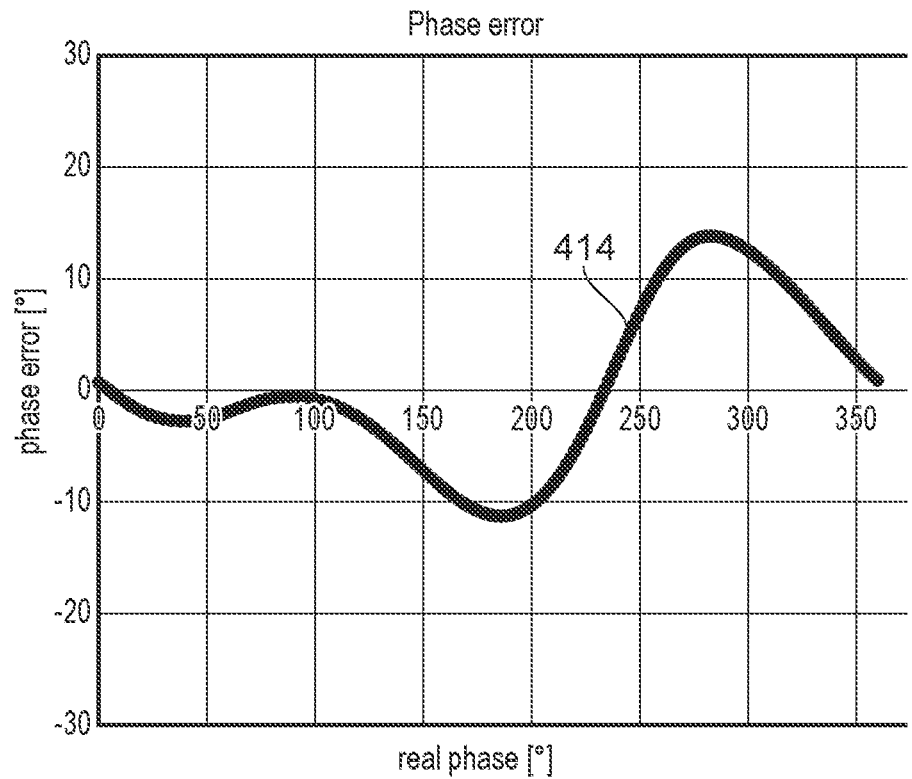
FIG. 4E shows a phase error.
Figure 5A:
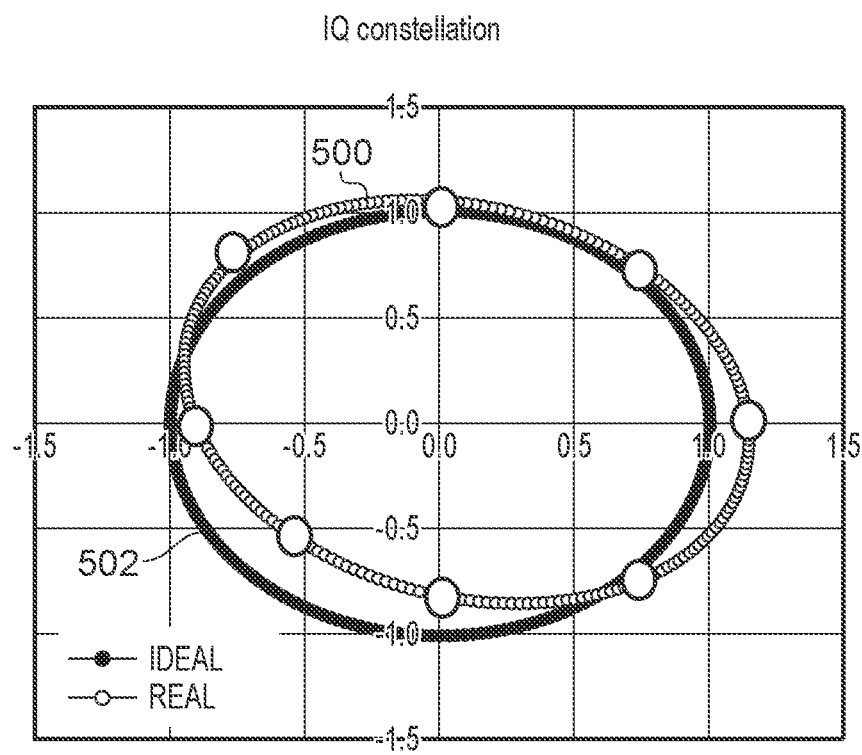
FIG. 5A shows a real IQ constellation and an ideal IQ constellation, as well as a maximum, minimum and average amplitude error and phase error.
Figure 5B:
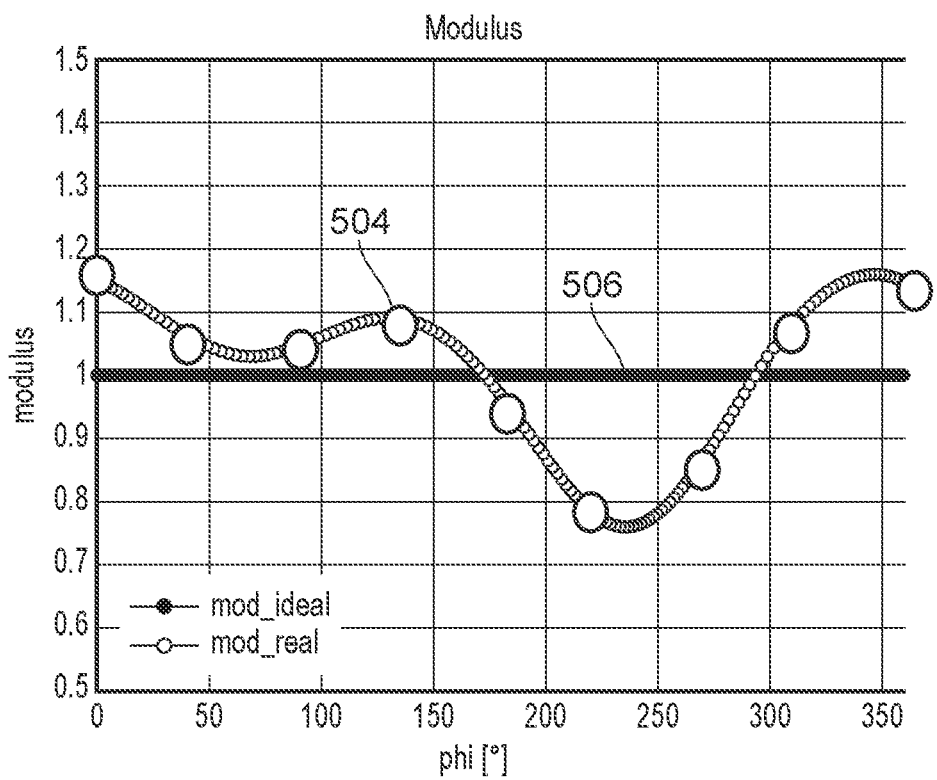
FIG. 5B shows a real modulus and an ideal modulus.
Figure 5C:
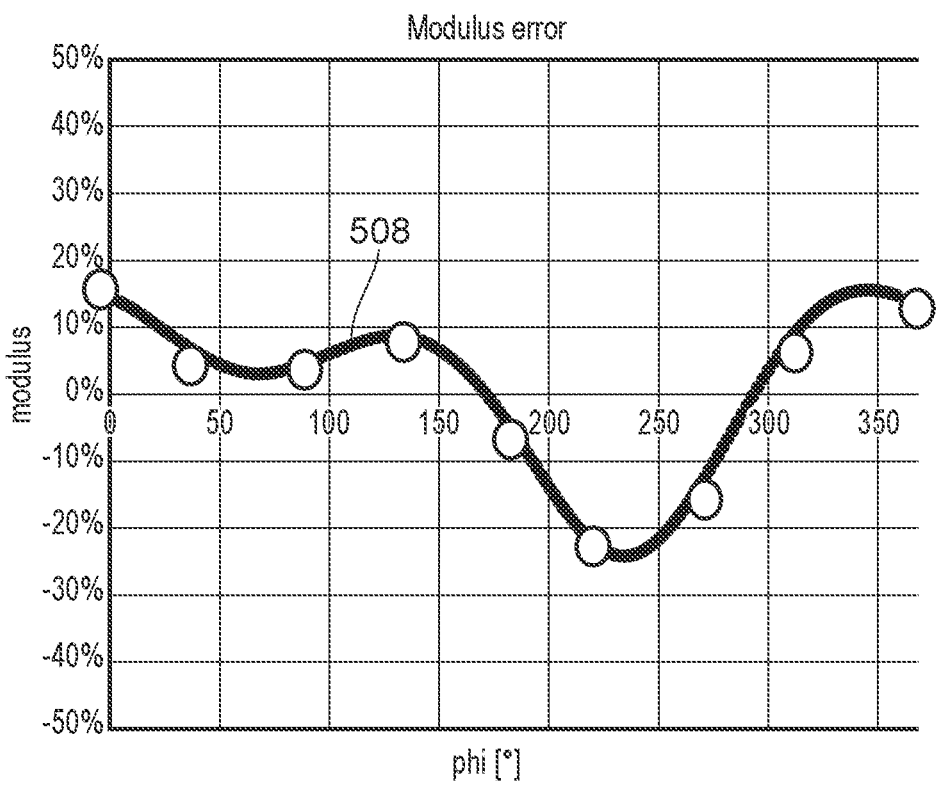
FIG. 5C shows a modulus error.
Figure 5D:
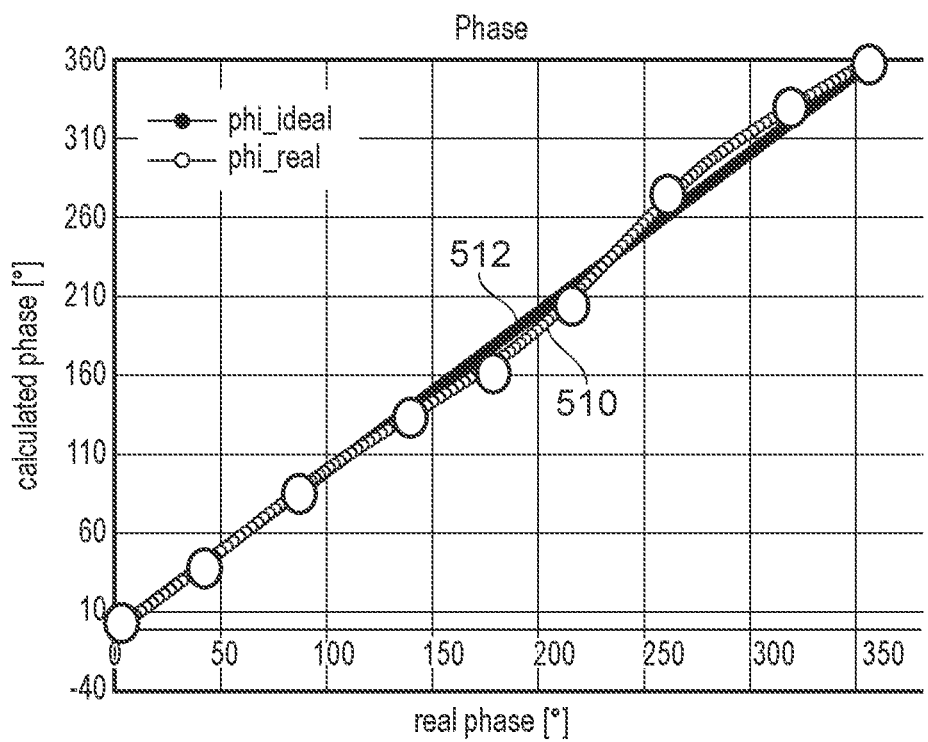
FIG. 5D shows a real phase and an ideal phase.
Figure 5E:
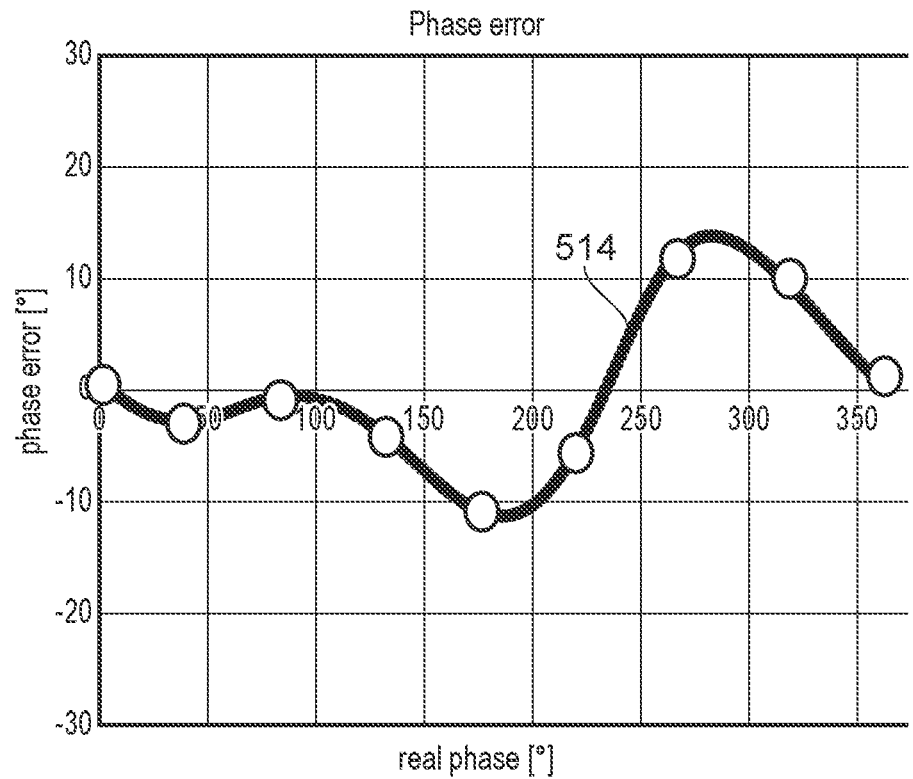
FIG. 5E shows a phase error.

FIG. 3 shows another illustrative embodiment of an RF communication device 300. In particular, a possible implementation is shown of an RF communication device according to the present disclosure. The skilled person will appreciate that the presently disclosed RF communication device may also be implemented in a different manner, with less or more components than the RF communication device 300 shown in FIG. 3. The RF communication device 300 comprises an RF front-end (RFFE) 302 coupled to an I-channel and a Q-channel receiver path. The I-channel receiver path comprises a mixer 302, a baseband amplifier 306, and an analog-to-digital converter 308. Similarly, The Q-channel receiver path comprises a mixer 310, a baseband amplifier 312, and an analog-to-digital converter 314. In addition, the RF communication device comprises an amplitude and phase measurement unit 316, i.e., a measurement unit of the kind set forth above. Furthermore, the RF communication device 300 comprises a clock generator 318, a phase-locked loop 320, an XTAL/reference clock 322, and a finite state machine 324 for controlling the amplitude and/or phase measurement.

Accordingly, the receiver system shown in FIG. 3 includes a crystal (XTAL) 322 functioning as a reference clock, a phase-locked loop (PLL) 320, and a clock generator 318 which provides all required clocks to the receiver. As mentioned above, FIG. 3 shows a possible implementation of an RF communication device according to the present disclosure. In other possible implementations, the receiver might use a carrier recovery loop to operate without any XTAL or external clock. In this example, the receiver includes an RF front-end (RFFE) 302, mixers 304, 310 (either continuous-time or discrete-time/sampling mixers), baseband processing units 306, 312 which might include some gain (fixed or variable, continuous or discrete-time) and some filtering (continuous or discrete-time), analog-to-digital converters (ADCs) 308, 314, an amplitude-and/or-phase measurement unit 316, and a finite state machine 324 that controls the amplitude and/or phase measurement. As mentioned above, the initial phase of the receiver may correspond to the initial phase of the mixer clock (i.e., clk_mix_i and clk_mix_q in FIG. 3), which can be shifted by the clock generator 318. For practical reasons, the clocks of the following blocks in the receiver (i.e., baseband processing units 306, 312 and ADCs 306, 314) may be shifted as well. Thus, in addition, the initial phase of the receiver may correspond to the initial phase of the baseband processing units 306, 312 (i.e., clk_bba_i and clk_bba_q) and the initial phase of the ADCs 308, 314 (i.e., clk_adc_i and clk_adc_q). In this example, changing or rotating the initial phase of the receiver means that the clocks provided to the mixers 304, 310, and optionally the clocks provided to the baseband processing units 306, 312 and ADCs 308, 314, are varied in steps.

FIGS. 4A to 4E show a real IQ constellation 400 and an ideal IQ constellation 402, a real modulus 404 and an ideal modulus 406, a modulus error 408, a real phase 410 and an ideal phase 412, and a phase error 414, respectively. More specifically, the DC offsets, IQ amplitudes and phase imbalances of a typical RF communication device are shown, having the following parameters: Ioff=10 LSB, Qoff=10 LSB, 10% IQ gain imbalance, −10° phase imbalance. It is noted that Ioff represents the DC offset on the I-path, Qoff represents the offset on the Q-path. Furthermore, it is noted that the modulus (=sqrt(I^2+Q^2)) is a representation of the amplitude. In particular, it may be observed that without applying the principles disclosed herein, the amplitude measurement error may be as large as 25% and the phase error as large as 14°, depending on the initial phase of the receiver unit.

FIGS. 5A to 5E show a real IQ constellation 500 and an ideal IQ constellation 502 including errors of combined amplitude and phase values, a real modulus 504 and an ideal modulus 506, a modulus error 508, a real phase 510 and an ideal phase 512, and a phase error 514, respectively. More specifically, it is shown that an error reduction may be achieved in the amplitude and phase measurements by computation at 8 different angles, wherein the RF communication device again has the following parameters: Ioff=10 LSB, Qoff=10 LSB, 10% IQ gain imbalance, −10° phase imbalance. In particular, it may be observed that the accuracy may be improved significantly by combining several amplitude and phase measurements corresponding to several equidistant phase locations all along the IQ plane. With the same impairments as in FIGS. 4A to 4E, the amplitude error may be reduced from 25% to 1% and the phase error from 14° to 0.01° using 8 measurements corresponding to 8 phases across the trigonometric circle. It is noted that the combined amplitude may be calculated as follows: amplitude=mean{amp(i)}, wherein i is the index of the measurement, and phase=mean{phase(i)+phase_rx(i)}, wherein i is the index of the measurement and phi_rx(i) is the initial phase of the receiver unit used for measurement number i.

Figure 6A:
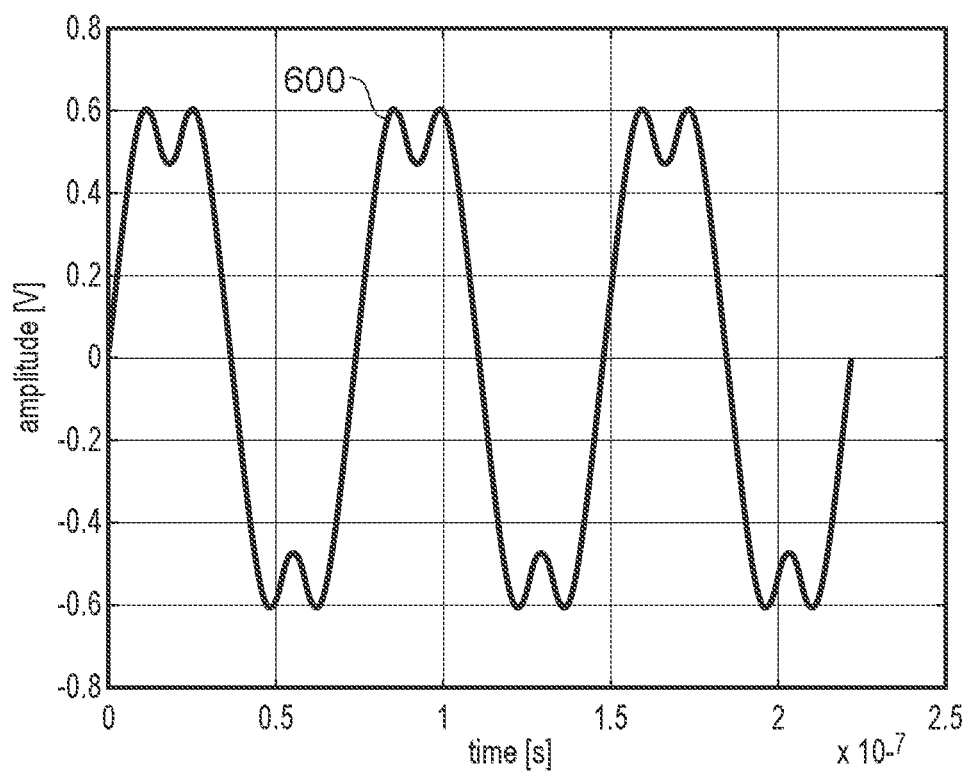
FIG. 6A shows an input signal of the RF communication device.
Figure 6B:
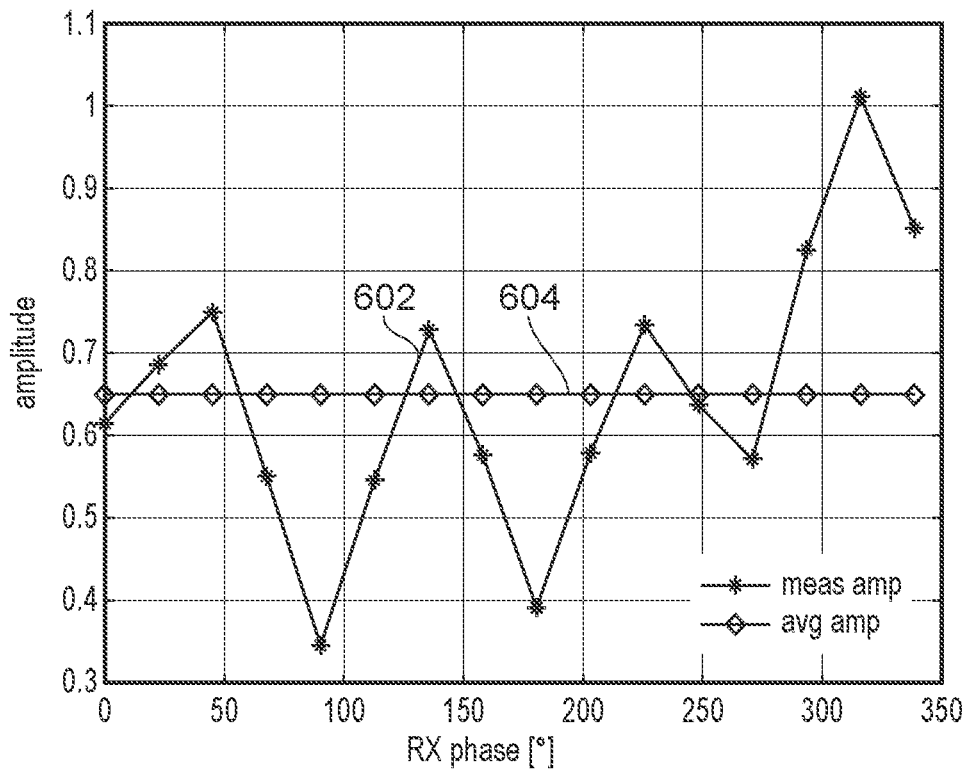
FIG. 6B shows a measured amplitude and an averaged amplitude of the input signal.
Figure 6C:
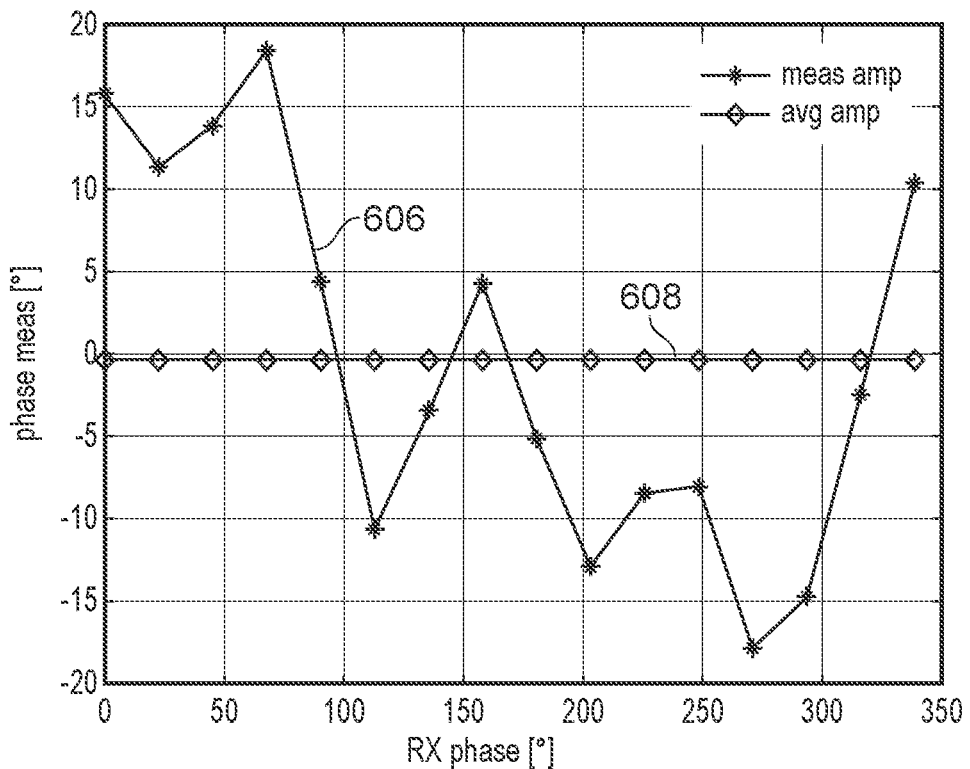
FIG. 6C shows a measured phase and an averaged phase of the input signal.

FIGS. 6A to 6C show an input signal 600 of the RF communication device, a measured amplitude 602 and an averaged amplitude 604 of the input signal, and a measured phase 606 and an averaged phase 608 of the input signal, respectively. More specifically, it is shown that by applying one or more of the principles disclosed herein a significant error reduction may also be achieved with a highly distorted input signal. It is noted that the same IQ impairments (offset error, gain error, phase error) as shown in FIGS. 5A to 5F apply in this scenario as well. In particular, it may be observed that a significant error reduction in the amplitude and phase measurements may be achieved by a computation at 16 different angles. Again, the RF communication has the following parameters: Ioff=10 LSB, Qoff=10 LSB, 10% IQ gain imbalance, −10° phase imbalance.

Figure 7:
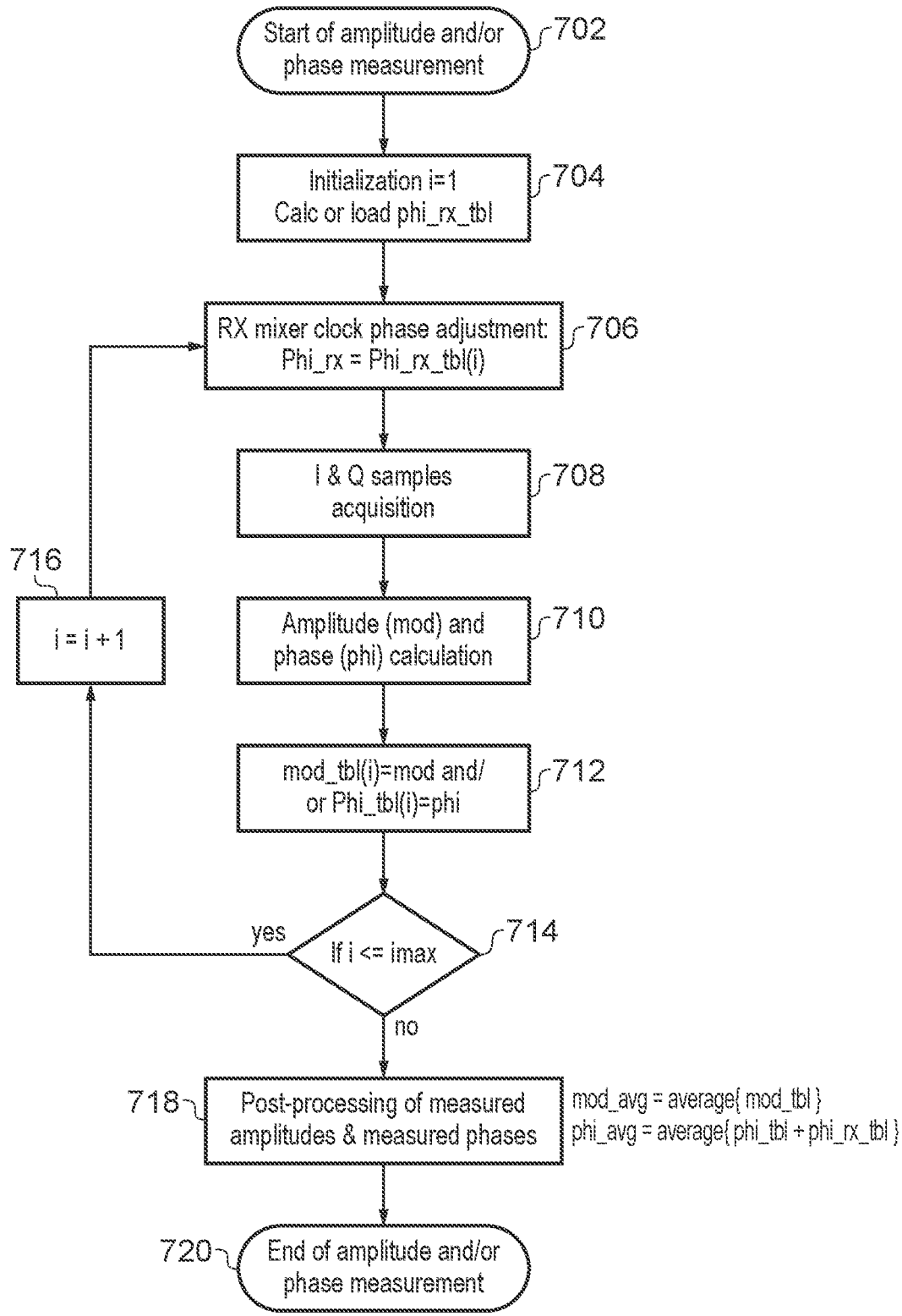
FIG. 7 shows another illustrative embodiment of a method of operating an RF communication device.

FIG. 7 shows another illustrative embodiment of a method 700 of operating an RF communication device. The method 700 comprises the following steps. At 702, the amplitude and/or phase measurement is started. At 704, an initialization step is performed. At 704, the clock phase of the mixer comprised in the receiver unit is adjusted. As mentioned above, in addition to the clock phase of the mixer, the clock phase of other components, such as a baseband processing unit and analog-to-digital converter, may be adjusted. At 708, I and Q samples are acquired, at 710, the corresponding amplitude and phase are calculated, and at 712, the results are stored in a table before further processing. At 714, it is checked if more iterations are needed, i.e., if further amplitude and phases have to be obtained at different initial phases of the receiver unit. If so, the iteration count is increased 716 and the method 700 returns to step 706. If not, the measured amplitudes and phases are post-processed 718, i.e., combined as set forth above. At 720, the amplitude and/or phase measurement is ended. In particular, FIG. 7 shows a suitable sequencing which allows rotating across the trigonometric circle, and which significantly reduces the amplitude and phase errors caused by IQ impairments. The initial phase shift of the receiver unit is adjusted in order to implement this phase rotation, which facilitates increasing the accuracy of amplitude and phase measurements. It is noted that the gain settings of the receiver unit may be frozen during this sequencing.

It is noted that the principles disclosed herein are not limited to a specific algorithm for calculating the amplitude and phase. In particular, the skilled person will appreciate that any suitable algorithm may be used for combined the measured amplitudes and/or phases obtained for the different initial phases of the receiver unit. For instance, in an example the amplitude may be calculated as mod=sqrt (I^2+Q^2). In another example, a Cordic algorithm may be used for iteratively calculating the amplitude and phase. In yet another example, the angle may be calculated offline by a CPU using any suitable arc-tangent function means (e.g., LUT, atan, atan 2).

Furthermore, it is noted that time-averaging may be applied to reduce the impact of noise. Also, the receiver unit may include a clock recovery system in order to be phase-and-frequency locked on the input RF signal. In addition, the receiver unit may be synchronized to a transmitter unit included in the same chip. In that case, an external matching network or filter may be calibrated by applying one or more of the principles disclosed herein. Furthermore, the phase rotation may be performed across the full trigonometric circle, or across a part of the trigonometric circle (e.g., 1, 2 or 3 quadrants).

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 RF communication device
102 receiver unit
104 controller
106 measurement unit
200 method of operating an RF communication device
202 receiving, by a receiver unit comprised in an RF communication device, at least one radio frequency signal, wherein the receiver unit has a variable initial phase 204 changing, by a controller comprised in the RF communication device, said initial phase
206 measuring, by a measurement unit comprised in the RF communication device, a plurality of amplitudes and/or phases of the radio frequency signal, wherein each of said amplitudes and/or phases of the radio frequency signal corresponds to a different initial phase of the receiver unit
300 RF communication device
302 RF front-end
304 mixer
306 baseband amplifier
308 analog-to-digital converter
310 mixer
312 baseband amplifier
314 analog-to-digital converter
316 amplitude and phase measurement unit
318 clock generator
320 phase-locked loop
322 XTAL/reference clock
324 finite state machine
400 real IQ constellation
402 ideal IQ constellation
404 real modulus
406 ideal modulus
408 modulus error
410 real phase
412 ideal phase
414 phase error
500 real IQ constellation
502 ideal IQ constellation
504 real modulus
506 ideal modulus
508 modulus error
510 real phase
512 ideal phase
514 phase error
600 input signal
602 measured amplitude
604 averaged amplitude
606 measured phase
608 averaged phase
700 method of operating an RF communication device
702 start of amplitude and/or phase measurement
704 initialization
706 receiver mixer clock phase adjustment
708 I and Q samples acquisition
710 amplitude and phase calculation
712 mod_tbl(i)=mode and/or phi_tbl(i)=phi
714 check if more iterations are needed
716 increase iteration count
718 post-processing of measured amplitudes and measured phases
720 end of amplitude and/or phase measurement

The invention claimed is:

1. A radio frequency, RF, communication device, comprising:
a receiver unit configured to receive at least one radio frequency signal, wherein the receiver unit has a variable initial phase;
a controller configured to change said initial phase by rotating the initial phase of the receiver unit in order to obtain a plurality of different initial phases of the receiver unit, wherein the different initial phases are at equidistant phase locations along the IQ-plane; and
a measurement unit configured to measure a plurality of amplitudes and/or phases of the radio frequency signal, wherein each of said amplitudes and/or phases of the radio frequency signal corresponds to a different initial phase of the plurality of different initial phases of the receiver unit.

2. A radio frequency, RF, communication device, comprising:
a receiver unit configured to receive at least one radio frequency signal, wherein the receiver unit has a variable initial phase;
a controller configured to change the initial phase by rotating the initial phase of the receiver unit across a full trigonometric circle or across a part of said trigonometric circle in order to obtain a plurality of different initial phases of the receiver unit; and
a measurement unit configured to measure a plurality of amplitudes and/or phases of the radio frequency signal, wherein each of the amplitudes and/or phases of the radio frequency signal corresponds to a different initial phase of the plurality of different initial phases of the receiver unit.

3. The RF communication device of claim 1, further comprising a processing unit configured to calculate an average value of the plurality of measured amplitudes and/or phases of the radio frequency signal.

4. The RF communication device of claim 3, wherein the processing unit is configured to calculate the average of the measured phases after adding a receiver clock phase shift for each of the measured phases.

5. The RF communication device of claim 1, further comprising a clock recovery unit configured to lock a mixer clock of the receiver unit to the phase of the radio frequency signal.

6. The RF communication device of claim 1, further comprising a transmitter unit and a reference clock, wherein the reference clock is shared between the receiver unit and the transmitter unit, and wherein the controller is further configured to change an initial phase of the transmitter unit.

7. The RF communication device of claim 6, wherein the measurement unit is configured to measure a plurality of further amplitudes and/or phases of the radio frequency signal, wherein each of said further amplitudes and/or phases of the radio frequency signal corresponds to a different initial phase of the transmitter unit.

8. The RF communication device of claim 7, further comprising a processing unit configured to calculate an average value of the plurality of measured further amplitudes and/or phases of the radio frequency signal.

9. The RF communication device of claim 1, being a near field communication, NFC, device and/or a wireless charging device.

10. The RF communication device of claim 9, configured to perform a low-power card detection for NFC or NFC-based wireless charging.

11. A method of operating a radio frequency, RF, communication device, the RF communication device comprising a receiver unit, a controller and a measurement unit, and the method comprising:
receiving, by the receiver unit, at least one radio frequency signal, wherein the receiver unit has a variable initial phase;
changing, by the controller, said initial phase by rotating the initial phase of the receiver unit in order to obtain a plurality of different initial phases of the receiver unit, wherein the different initial phases are at equidistant phase locations along the IQ-plane; and
measuring, by the measurement unit, a plurality of amplitudes and/or phases of the radio frequency signal, wherein each of said amplitudes and/or phases of the radio frequency signal corresponds to a different initial phase of the plurality of different initial phases of the receiver unit.

12. A method of operating a radio frequency, RF, communication device, the RF communication device comprising a receiver unit, a controller and a measurement unit, and the method comprising:
receiving, by the receiver unit, at least one radio frequency signal, wherein the receiver unit has a variable initial phase;
changing, by the controller, said initial phase by rotating the initial phase of the receiver unit across a full trigonometric circle or across a part of said trigonometric circle in order to obtain a plurality of different initial phases of the receiver unit; and
measuring, by the measurement unit, a plurality of amplitudes and/or phases of the radio frequency signal, wherein each of said amplitudes and/or phases of the radio frequency signal corresponds to a different initial phase of the plurality of different initial phases of the receiver unit.

13. The method of claim 11, wherein a processing unit calculates an average value of the plurality of measured amplitudes and/or phases of the radio frequency signal.

14. The method of claim 13, wherein the processing unit calculates the average of the measured phases after adding a receiver clock phase shift for each of the measured phases.

15. The method of claim 11, wherein a clock recovery unit locks a mixer clock of the receiver unit to the phase of the radio frequency signal.

16. The method of claim 11, wherein a reference clock is shared between the receiver unit and a transmitter unit, and wherein the controller changes an initial phase of the transmitter unit.

* * * * *